US008670314B2

(12) United States Patent
Jiang et al.

(10) Patent No.: US 8,670,314 B2
(45) Date of Patent: Mar. 11, 2014

(54) MESSAGE LOSS PREVENTION BY USING SENDER BUFFER AND TRAFFIC SHAPING IN EVENT-TRIGGERED DISTRIBUTED EMBEDDED REAL-TIME SYSTEMS

(75) Inventors: Shengbing Jiang, Rochester Hills, MI (US); Sandeep Menon, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 12/985,518

(22) Filed: Jan. 6, 2011

(65) Prior Publication Data

US 2012/0176895 A1      Jul. 12, 2012

(51) Int. Cl.
*H04L 12/54*    (2013.01)
*H04L 12/26*    (2006.01)

(52) U.S. Cl.
USPC ........................................ 370/230.1; 370/428

(58) Field of Classification Search
None
See application file for complete search history.

(56) References Cited

U.S. PATENT DOCUMENTS

| 6,111,888 | A | 8/2000 | Green et al. | |
| 7,539,756 | B2* | 5/2009 | Marchetto et al. | 709/226 |
| 2005/0047345 | A1* | 3/2005 | Suh | 370/235 |
| 2006/0271694 | A1* | 11/2006 | Matsuo et al. | 709/229 |
| 2008/0137679 | A1 | 6/2008 | Horst et al. | |
| 2010/0329272 | A1* | 12/2010 | Tsuboi et al. | 370/401 |

FOREIGN PATENT DOCUMENTS

DE        69923938 T2    4/2006

* cited by examiner

*Primary Examiner* — Chirag Shah
*Assistant Examiner* — Steve Young

(57) ABSTRACT

A vehicular distributed embedded real-time controller area network system includes ECUs that function in an event-triggered mode to initiate a transmission of the message to the communication bus. Each ECU includes a sender buffer for storing the generated message. A bus controller interfaces with the ECUs and manages the transfer of messages to and from the communication bus. The transfer of messages onto the communication bus is executed by the controller area network controller on an interrupt basis. The bus controller being unavailable to receive a message from the ECU when a previous message stored within a memory of the bus controller is awaiting transmission on the communication bus. The bus controller is available to receive a message from the ECU when the memory is empty. The sender buffer stores messages received from the electronic control unit when the bus controller is unavailable. The ECU further includes a traffic shaping module for selectably delaying a transfer of messages to the bus controller.

15 Claims, 4 Drawing Sheets

MESSAGE LOSS PREVENTION BY USING SENDER BUFFER AND TRAFFIC SHAPING IN EVENT-TRIGGERED DISTRIBUTED EMBEDDED REAL-TIME SYSTEMS

BACKGROUND OF INVENTION

An embodiment relates generally to controller area network systems within a vehicle.

A controller-area network (CAN) is a vehicle bus standard intended to allow electronic control units (ECUs) and other devices to communicate with one another without a central or host computer. Vehicle systems and subsystems have numerous ECUs that control actuators or receive vehicle operation data from sensing devices. The CAN system is an asynchronous broadcast serial bus which communicates messages serially. Therefore, only one message is communicated on a communication-bus at one instance of time. When a message is ready to be transmitted onto the communication bus, the CAN-controller controls the message transfer on the bus. If more than one message transmission is initiated simultaneously by multiple transmitters, the more dominant message is transmitted. This is known as an arbitration process. A message with a highest priority will dominate the arbitration and a message transmitting at the lower priority will sense this and wait.

In various scenarios, messages may be processed by different nodes in succession within a CAN system. In such a scenario, the messages are provided to a first node and the messages are processed at different instances of time. When the processing for a respective message is completed at a respective node, it is transmitted along the communication bus to a next node for additional processing. Meanwhile, the next messages are processed in the first node, and are thereafter successively transmitted along the communication bus to the next node for additional processing. Due to inherent delays in processing messages, or contention in the communication bus, messages may be lost in the communication process since there is no central or host computer to assure that each of the messages maintained and not dropped. In such an instance, the message content may get lost because of overwrite by another message value. Moreover, if the buffer space of a sending unit is limited, and if a next message is sent for communication while the sending unit still maintains the previous message in the buffer, then the current sent message will be lost due to contention at the sender buffer. Therefore, there is a need to assure that messages are properly processed by the CAN system without losing the messages.

SUMMARY OF INVENTION

An advantage of an embodiment is the storing of messages in a sender buffer queued for transmission on the communication bus and the time interval at which the messages are transferred to from the sender buffer to the bus controller which reduces the chances of a message being dropped from the CAN system due to contention at a receiver side of a node. Contention between transmitted messages that are the result of delays in transmission due to jitter, finite CAN controller buffer size, and asynchronous clocks can be avoided utilizing a sender buffer and timer function that indicates when a stored message may be transmitted on the communication bus.

An embodiment contemplates a distributed embedded real-time controller area network system for a vehicle. A communication bus transmits messages within the controller area network system. A plurality of nodes forms a plurality of communication endpoints that are communicably coupled by the communication bus. Each node comprises at least one application component for generating vehicle operation data and an electronic control unit in communication with the at least one application component. The electronic control unit generates a message containing the vehicle operation data. The electronic control unit functions in an event-triggered mode to initiate a transmission of the message to the communication bus. The electronic control unit includes a sender buffer for storing the generated message and a bus controller that interfaces with the electronic control unit. The bus controller manages the transfer of messages to and from the communication bus. The transfer of messages onto the communication bus is executed by the controller area network controller on an interrupt basis. The bus controller being unavailable to receive a message from the electronic control unit when a previous message stored within a memory of the bus controller is awaiting transmission on the communication bus. The bus controller is available to receive a message from the electronic control unit when the memory is empty. The sender buffer stores messages received from the electronic control unit when the bus controller is unavailable. The electronic control unit further includes a traffic shaping module for selectably delaying a transfer of messages to the bus controller.

An embodiment contemplates a method for communicating messages between nodes within a distributed embedded real-time controller area network system of a vehicle. The controller area network system includes a communication bus and a bus controller for controlling a transmission of messages on the communication bus where the transfer of messages onto the communication bus is executed by the bus controller on an interrupt basis. The controller area network system further includes a plurality of nodes that forms a plurality of communication endpoints that are communicably coupled by the communication bus. Each node includes at least one application component, an electronic control unit, a sender buffer, a receiver buffer, and at least one bus controller. The electronic control unit receives vehicle operation data from the at least one application component and generates a message that includes the vehicle operation data for transmission on the communication bus. The electronic control unit functions in an event-triggered mode for initiating the transmission of the message on the communication bus to a next respective node. The message is stored in the sender buffer in response to the bus controller being unavailable. The bus controller is unavailable to receive the next message from the electronic control unit when a previous message stored within a memory of the bus controller is awaiting transmission on the communication bus. The bus controller is available to receive a message from the electronic control unit when the memory is empty. A determination is made when the previous message stored in the bus controller is successfully transmitted on the communication bus. A traffic shaping flag is unset in response to the previous message stored in the bus controller being successfully transmitted on the communication bus. Unsetting the traffic shaping flag indicates that messages can not be transferred to the bus controller. A determination is made when the predetermined period of time elapses. In response to the predetermined period of time elapsing, the traffic shaping flag is set for indicating that a message can be transferred to the bus controller. The message is transferred from the sender buffer to the bus controller in response to setting the traffic shaping flag.

DETAILED DESCRIPTION

Figure 1:
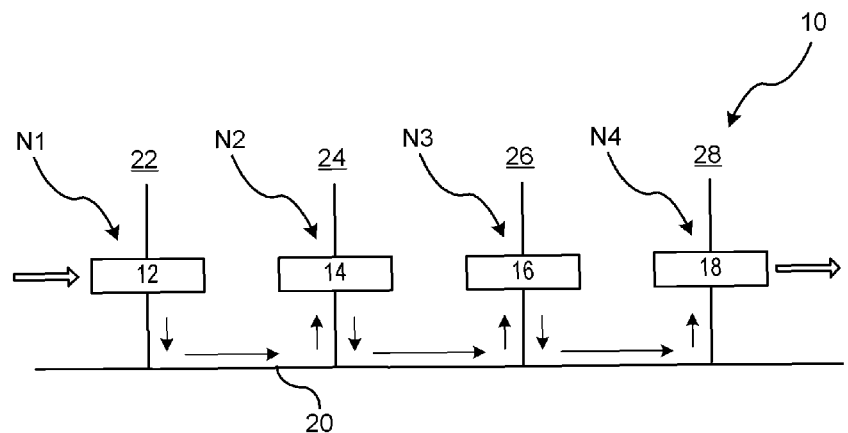
FIG. 1 is a schematic illustration of a controller area network system.

There is shown in FIG. 1 a controller area network (CAN) system 10. The CAN system 10 includes a plurality of electronic control units (ECUs) 12-18 coupled to a communication bus 20 which allows the ECUs to communicate with one another. Each of the plurality of ECUs 12-18 are coupled to one or more sensors, actuators, or control devices (the group hereinafter referred to as application components) and are generally represented by 22-28, respectively. The application components are not directly connected to the communication bus 20, but are coupled through the respective ECUs. The application components could also be software components in ECUs. A single control feature may span across multiple application components, and involve control messages from source to destination ECU via one or more intermediate processing/control ECUs attached to the same communication bus. For the purposes of this invention, it is understood that CAN systems are known in the art and that ECUs, application devices, CAN controllers, and transceivers are referred to as nodes and the details of their composition will not be discussed in detail herein.

Figure 2:
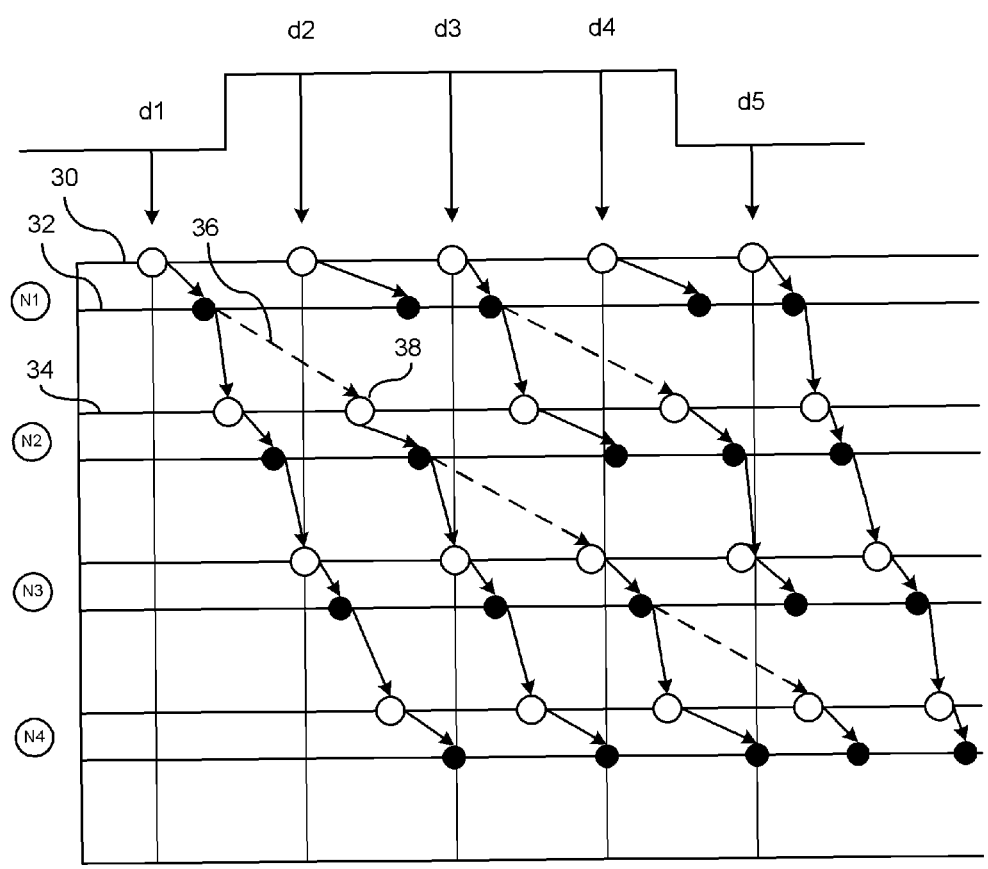
FIG. 2 is a timeline illustrating data message processing in the controller area network system.

In FIG. 1, messages are serially communicated over the communication bus 20 to each ECU 12-18 and then to the application components 22-28. Each node N1, N2, N3, and N4 processes each message prior to transmitting each message to a next respective node. Five messages d1-d5 in the message class are illustrated in FIG. 2. Messages d1-d5 are transmitted sequentially to the first node N1. At the first node N1, each message is processed on a periodic basis and then is respectively transmitted to the second node N2 for additional processing. Timeline 30 represents respective times when the messages d1-d5 are input to the first node N1. Timeline 32 represents respective times when the messages d1-d5 are provided to a bus controller (hereinafter referred to as a bus controller) for transmission to the second node N2 via the communication bus. Each node will have at least one bus controller for controlling messages communicated to and from the communication bus.

Due to contention on the communication bus, a message may not be immediately added to the bus controller. If contention is present, then the message could be lost.

An example of message loss is illustrated in FIG. 2. The first message d1 is processed in the first node N1 and then is transmitted on the communication bus to the second node N2. Timeline 34 illustrates the time when the message d1 is received at the second node N2. Message d1 is processed in the second node N2 and is then provided to the bus controller for transmission on the communication bus. Message d2 is successfully transmitted on the communication bus and received by the second node N2 as illustrated on timeline 32. Before the arrival of message d2 at node N2, the second execution of the application component on node N2 needs the input, shown at 38, in which case the first message d1 is reused, as shown by the dotted line 36 in FIG. 2. Between the second execution and the third execution of the application component on node N2 on line 34, two input messages d2 and d3 arrive at node N2 as shown on line 32 in FIG. 2. Since the typical buffer size for each node can only accommodate one message, message d2 will be overwritten by message d3 before it could be used by the application component on node N2. As a result, the third execution of the application component on node N2 will use message d3 and message d2 will get lost.

FIG. 2 further shows that messages d3 and d4 are also lost due to contention at the receiver buffers where message d1 is repeatedly reused. The processed messages output from the fourth node N4 include messages d1-d1-d1-d1-d5. Data messages d2, d3, d4 are lost due to message overwritten which may be the direct result of jitter, finite buffers, or asynchronous clocks.

To reduce message loss due to contention at the bus controller or on the communication bus, software-based sender buffers are utilized in each node. CAN Controller hardware contains hardware buffer cells (CAN mailboxes) used for data transmission and receiving. Therefore, the embodiments described herein are directed at a software based buffering strategy without any impacts to the actual CAN Controller hardware buffer usage. A respective ECU within a node will include a sender buffer that is shared by all application components on the respective node. For example, for nodes N1-N4 as described in FIG. 2, a common sender buffer is utilized for all application components in N1, a common sender buffer is utilized for all application components in N2, a common sender buffer is utilized for all application components in N3, and a common sender buffer is utilized for all application components in N4.

Figure 3:
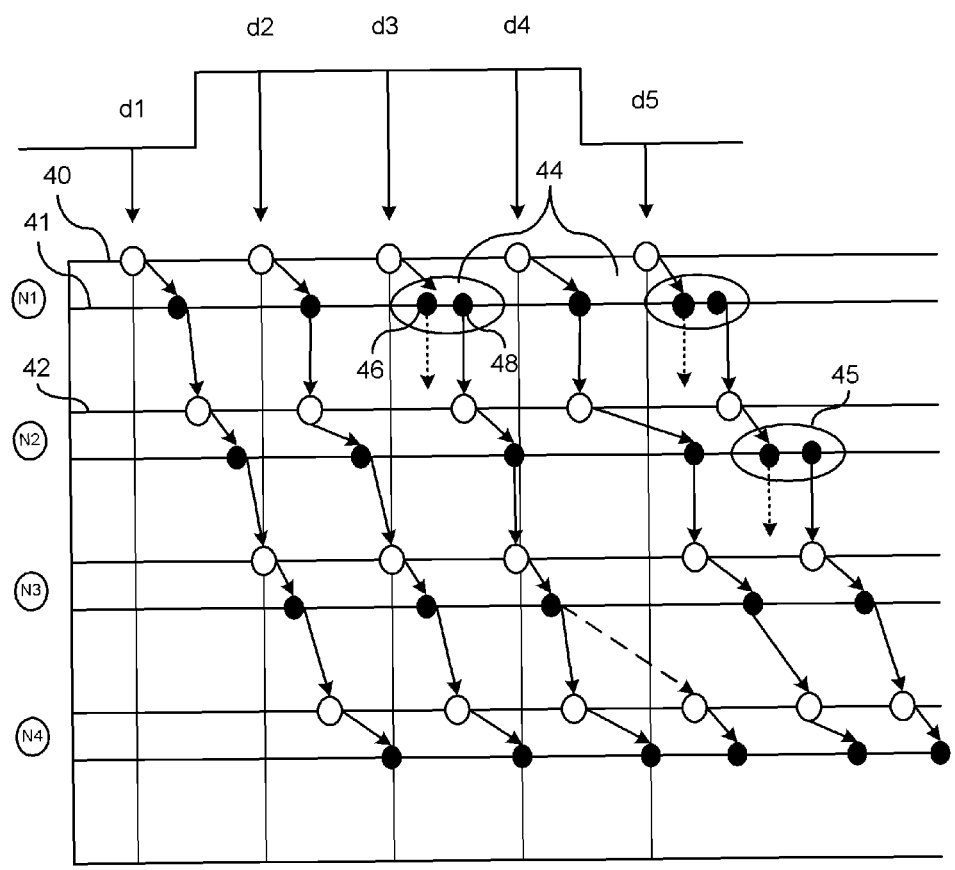
FIG. 3 is a timeline illustrating a buffering technique for the controller area network system.

FIG. 3 illustrates the utilization of a sender buffer for preventing message loss. As shown in FIG. 3, messages d1-d5 are transmitted to the first node N1 at periodic instances of time as shown on timeline 40. Timeline 41 represents the time when the messages are transmitted out to the bus controller. Timeline 42 represents the time when the messages are transmitted out on the communication bus and received by the second node N2.

A sender buffer 44 is integrated within the ECU of the first node N1 and is shared by all application components on the first node N1. The sender buffer 45 is integrated within the ECU of the second node N2 and is shared by all application components on the second node N2. The sender buffer 44 temporarily stores messages until (1) the bus controller is ready to accept a next message for transmission on the communication bus, and (2) a predetermined period of time elapses since a previous message was transmitted. Awaiting a predetermined period of time to elapse after the previous message is transmitted on the communication bus assures that a sufficient amount of time is provided to the receiving unit of the next node to receive and process the message. At the receiver side of a respective node, both the receiving device and the application component are executed on an interrupt basis. As result, messages are timely transmitted by the bus controller at timed intervals to assure that ample time has been given to the application component to read the input data in the previous message so that the previous message may be purged before a next message is received. Therefore, even if the bus controller is empty and available to receive a message, a message from the class of messages d1-d5 cannot be transferred to the controller until a predetermined period of time elapses after the bus controller confirms that a the previous message was successfully transmitted on the communication bus.

In FIG. 3 message d2 is shown as being transmitted on the communication bus by the bus controller on timeline 41. Message d3 is transferred to the first node N1 for processing and is available for transfer to the bus controller as shown generally at 46 on timeline 41. However, the predetermined period of time has not elapsed which commences to run after a confirmation message is recorded by the bus controller that indicates that the message d2 is successfully transmitted on the communication bus. As a result, message d3 which is available for transfer at time instance 46 is maintained in the sender buffer 44 until the predetermined period of time has expired, as indicated at time instance 48. At time instance 48, the message is transferred to the bus controller for transmission on the communication bus. Each ECU executes a traffic shaping routine which determines when the predetermined period of time has elapsed which indicates when a message may be transferred to bus controller based on a timer function.

Figure 4:
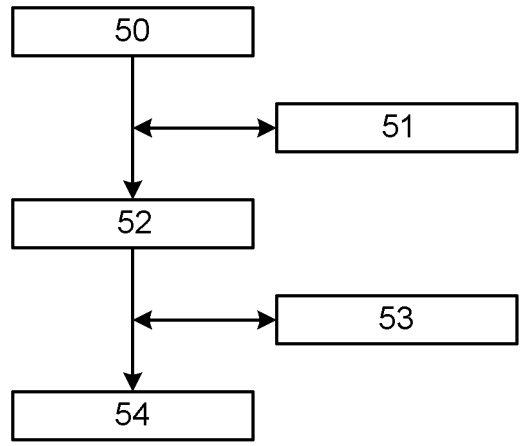
FIG. 4 is a flowchart of a buffering technique for a sender buffer according to an embodiment of the invention.

FIG. 4 illustrates a broad overview of a flow diagram for a sender buffer management technique for transferring messages from an application component of a respective node to the bus controller.

In block 50, the application component processes the vehicle operation data and transfers the data to the ECU within the node for generating and transmitting a message on the communication bus. In block 51, the sender buffer enqueuing task is initiated. In block 52, the respective message is stored in a respective cell of the sender buffer. In block 53, the sender buffer dequeuing task is initiated. In block 54, the message is transferred to the bus controller for transmission on the communication bus.

The process for buffering messages to the bus controller is managed by an enqueuing task module and a dequeuing task module. The enqueuing task is executed when the ECU cannot transmit a message to the bus controller due to the memory of the bus controller being occupied. The enqueuing task module provides a routine for adding the message to a respective cell of the sender buffer when the bus controller is unavailable.

The sender buffer includes a plurality of buffer cells. Each buffer cell within the sender buffer is treated as an individual memory block and the messages in different buffer cells are ordered in a sender message link list. The sender message link list prioritizes the order of the buffer cells. Vehicle operation data is provided by the application component to the ECU. The enqueuing task module adds the message containing the vehicle operation data to the sender buffer. The enqueuing task module of the ECU maintains a binary flag for each buffer cell. When a corresponding buffer cell is empty, the binary flag is set to 1. When a corresponding buffer cell is occupied, the binary flag is set to 0.

When the enqueuing task module needs to add a new message to the sender buffer, a status of the binary flag in each buffer cell is first checked. If the binary flag indicates that there is an empty buffer cell (i.e., binary flag set to 1), then the new message will be entered into the buffer cell and the respective buffer cell is added to the end of the sender message link list. The flag of the respective buffer cell is changed from 1 to 0. In the event that there is no empty buffer cell available, then different deletion policies can be adopted to accommodate the new message such as the oldest message deleted first or the lowest priority message deleted first.

The dequeuing task is used to orderly transfer messages from the sender buffer to the bus controller. The dequeuing task is triggered after a confirmation message is received from the bus controller and after a traffic timer flag is set. That is, when the dequeuing task is executed, a message is transferred from the sender buffer to the bus controller only after the determination is made that the bus controller is available and after the predetermined period of time has elapsed since the previous message was successfully transmitted on the communication bus from the bus controller. If the conditions for transferring the message is satisfied, then the message will be transferred to the bus controller and the respective message will be deleted in the sender buffer; otherwise, the message will remain in the sender buffer and wait until those conditions are satisfied.

Upon a successful transmission of the message on the communication bus, the bus controller will generate a confirmation message that is received by the ECU. The traffic shaping module will unset a traffic shaping flag and a traffic shaping timer will be initiated. Upon expiration of the timer, the traffic shaping flag for this message class is set indicating that any message within this class d1-d5 can be sent to the bus controller by the dequeuing task.

The dequeuing task is executed when a confirmation message is received by the ECU and when the traffic shaping flag is set (i.e., traffic shaping timer expires). Various dequeuing policies may be used for determining which message in the sender buffer is selected for transfer to the communication controller. Dequeuing policies may include the oldest message deleted first or highest priority message deleted first.

Figure 5:
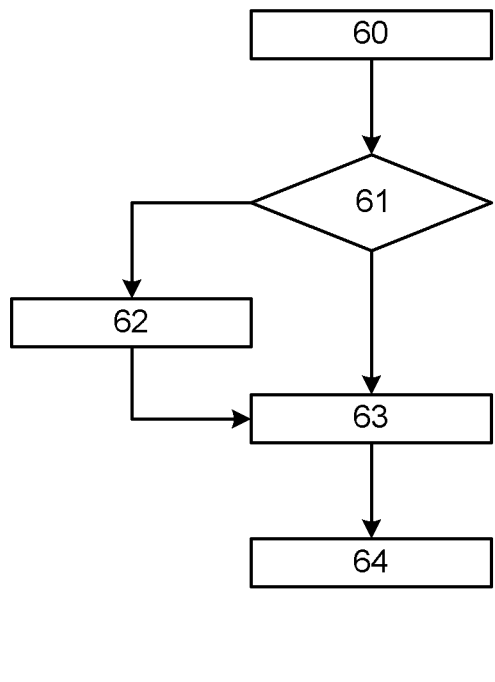
FIG. 5 is a flowchart for an enqueuing task for the sender buffer according to an embodiment of the invention.

FIG. 5 illustrates a detailed process of the sender buffer enqueuing task module initiated as indicated in block 51 of FIG. 4. In block 60, the sender buffer enqueuing algorithm is initiated. In block 61, a determination is made as to whether an empty buffer cell is available in the sender buffer. This determination is based on whether any buffer cell has a binary flag indicating an empty cell status. If the determination is made that a buffer cell is empty, then the routine proceeds to block 63. If the determination is made that an empty buffer cell is not available in the sender buffer, then the routine proceeds to block 62.

In block 62, a currently stored message is deleted in the sender buffer cell according to the deletion policy (e.g., oldest message deleted first or lowest priority message deleted first).

In block 63, the new message is stored in the empty buffer cell. The binary flag of the buffer cell is set to 1, and the buffer cell is added to the sender message link list.

In block 64, the enqueuing algorithm ends for this respective transfer task.

Figure 6:
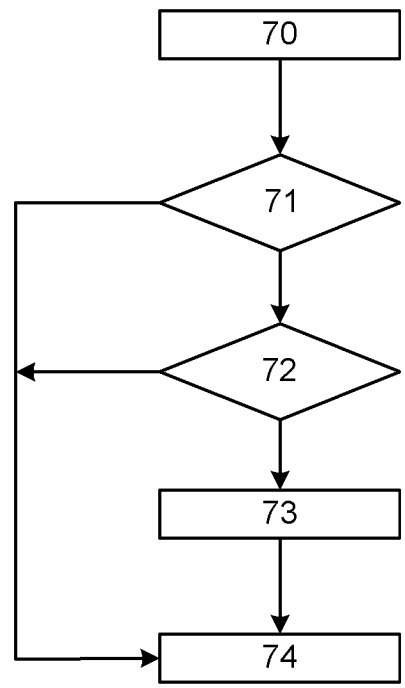
FIG. 6 is a flowchart for a dequeuing task for the sender buffer according to an embodiment of the invention.

FIG. 6 illustrates a detailed process of the sender buffer dequeuing task initiated as indicated in block 53 of FIG. 4. In block 70, the sender buffer dequeuing algorithm is initiated. In block 71, a determination is made as to whether the bus controller is available to accept a message. If the determination is made that the bus controller is not available, then the routine proceeds to block 74. If the determination is made that the bus controller buffer is available to accept a message, then the routine proceeds to block 72.

In block 72, a determination is made whether the traffic shaping flag is set. If the determination is made that the traffic shaping flag is unset, then the routine ends. If the determination is made that the traffic shaping flag is set, then the routine proceeds to block 73.

In block 73, the message is removed from the sender buffer and is transferred to the bus controller according to the dequeuing policies (e.g., oldest message is dequeued first or highest priority message is dequeued first).

In block 74, the dequeuing algorithm ends for the respective transfer task.

Figure 7:
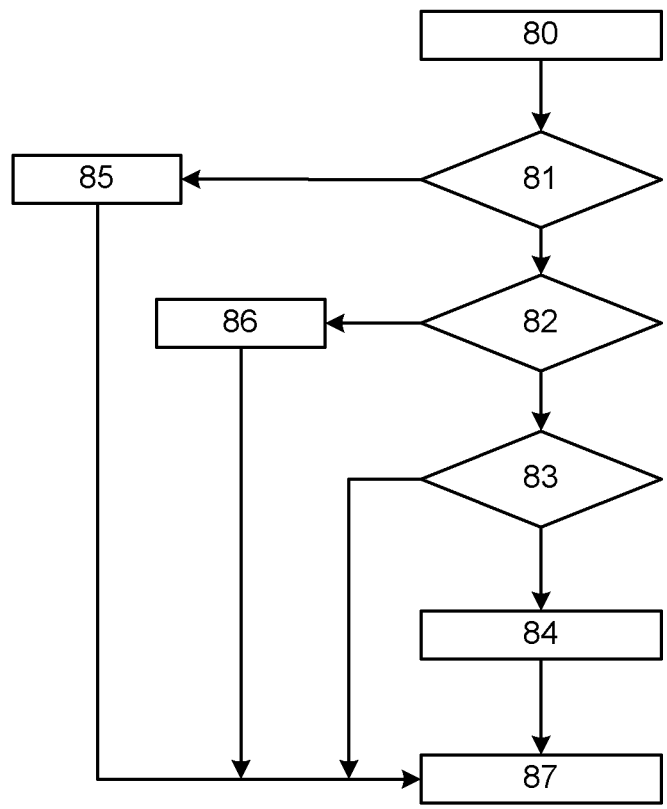
FIG. 7 is a flowchart of a traffic shaping management routine according to an embodiment of the invention.

FIG. 7 illustrates a flow diagram for the traffic shaping routine. In block 80, the traffic shaping routine is initiated. In block 81, a determination is made whether a message is sent to the bus controller. If the determination is made that a message has recently been sent to the bus controller by the ECU for this message class, then the routine proceeds to block 85. In block 85, the traffic shaping flag is unset. The routine proceeds to block 87. If the determination is made that a message was not recently sent to the bus controller, then the routine proceeds to block 82.

In block 82, a determination is made whether a confirmation message is received from the bus controller indicating that a previous message stored within the bus controller is successfully transmitted on the communication bus. If the confirmation message is received, then the routine proceeds to block 86. In block 86, the traffic shaping time is started for the class of messages. The routine then proceeds to the block 87. If the determination is made that no confirmation message is received, then the routine proceeds to block 83.

In block 83, a determination is made whether the traffic shaping timer has expired. If the traffic shaping timer is not expired, then the routine proceeds to block 87. If a determination is made that the traffic shaping time is expired, then the routine proceeds to block 84.

In block 84, the traffic shaping flag is set, and it triggers the dequeuing task for transferring a message to the bus controller. The routine proceeds to block 87.

In block 87, the traffic shaping routine for this task ends.

While certain embodiments of the present invention have been described in detail, those familiar with the art to which this invention relates will recognize various alternative designs and embodiments for practicing the invention as defined by the following claims.

What is claimed is:

1. A distributed embedded real-time controller area network system for a vehicle comprising:
    a communication bus for transmitting messages within the controller area network system;
    a plurality of nodes forming a plurality of communication endpoints that are communicably coupled by the communication bus, wherein each node comprises:
    at least one application component for generating vehicle operation data;
    an electronic control unit in communication with the at least one application component, the electronic control unit generating a message containing the vehicle operation data, the electronic control unit functioning in an event-triggered mode to initiate a transmission of the message to the communication bus, the electronic control unit including a sender buffer for storing the generated message;
    a bus controller that interfaces with the electronic control unit, the bus controller managing the transfer of messages to and from the communication bus, the transfer of messages onto the communication bus being executed by the controller area network controller on an interrupt basis, the bus controller being unavailable to receive a message from the electronic control unit when a previous message stored within a memory of the bus controller is awaiting transmission on the communication bus, and wherein the bus controller is available to receive a message from the electronic control unit when the memory is empty;
    wherein the sender buffer stores messages received from the electronic control unit when the bus controller is unavailable, wherein the electronic control unit further includes a traffic shaping module for selectably delaying a transfer of messages to the bus controller;
    wherein an enqueuing task module manages a transfer of messages from the electronic control unit to the sender buffer, wherein the enqueuing task module determines whether an empty cell is available within the sender buffer, and wherein the message is stored in the empty cell in response to the empty cell being available in the sender buffer; and
    wherein the sender buffer includes a sender message link list for maintaining a priority ordering of the stored messages, wherein the enqueuing task module adds the message to the sender message link list.

2. The system of claim 1, wherein the sender buffer is shared by multiple application components within a respective node.

3. The system of claim 1 wherein the enqueuing task module deletes a stored message in the sender buffer in response to an empty cell not being available in the sender buffer, and wherein the enqueuing task module adds the message to the sender message link list.

4. The system of claim 3, wherein the enqueuing task module deletes an oldest stored message within the sender buffer in response to an empty cell being unavailable in the sender buffer.

5. The system of claim 3, wherein the enqueuing task module deletes a message with the lowest priority within the sender buffer in response to an empty cell being unavailable in the sender buffer.

6. The system of claim 3, wherein the traffic shaping module actuates a timer when the bus controller successfully transmits a respective message on the communication bus, wherein the timer counts a predetermined period of time before a next message is transferred to the bus controller.

7. The system of claim 6, wherein a dequeuing task module manages a transfer of the next message from the sender buffer to the bus controller, wherein the dequeuing task module determines whether the predetermined period of time has elapsed, and wherein the dequeuing task module transfers the next message queued in the sender buffer to the bus controller in response to the predetermined period of time elapsing.

8. The system of claim 7, wherein the next message transferred from the sender buffer to the bus controller is an oldest message stored in the sender buffer.

9. The system of claim 7, wherein the next message transferred from the sender buffer to the bus controller is a message having a highest priority stored in the sender buffer.

10. A method for communicating messages between nodes within a distributed embedded real-time controller area network system of a vehicle, the controller area network system including a communication bus, a bus controller for controlling a transmission of messages on the communication bus where the transfer of messages onto the communication bus is executed by the bus controller on an interrupt basis, the controller area network system further including a plurality of nodes forming a plurality of communication endpoints that are communicably coupled by the communication bus, each node includes at least one application component, an electronic control unit, a sender buffer, a receiver buffer, and at least one bus controller, the method comprising the steps of:
    the electronic control unit receiving vehicle operation data from the at least one application component and generating a message that includes the vehicle operation data for transmission on the communication bus, the electronic control unit functioning in an event-triggered mode for initiating the transmission of the message on the communication bus to a next respective node;
    storing the message in the sender buffer in response to the bus controller being unavailable to receive a message, the bus controller being unavailable to receive the next message from the electronic control unit when a previous message stored within a memory of the bus controller is awaiting transmission on the communication bus, and wherein the bus controller is available to receive a message from the electronic control unit when the memory is empty;

determining when a previous message stored in the memory of the bus controller has been successfully transmitted on the communication bus;

determining when a predetermined period of time elapses after the successful transmission of the previous message stored in the bus controller; and transferring a next message from the sender buffer to the bus controller after the predetermined period of time elapses; and transmitting the message on the communication bus;

wherein an enqueuing task module is initiated for managing a transfer of messages from the electronic control unit to the sender buffer when the bus controller is unavailable, wherein the enqueuing task module determines whether an empty cell is available within the sender buffer, wherein the respective message is stored in the empty cell in response to the empty cell being available in the sender buffer; and wherein the sender buffer includes a sender message link list for maintaining a priority ordering of the stored messages, wherein the enqueuing task module deletes a stored message in the sender buffer in response to an empty cell not being available in the sender buffer, wherein the enqueuing task module adds the respective message to the empty cell.

11. The system of claim 10, wherein the oldest stored message is deleted within the sender buffer in response to an empty cell being unavailable in the sender buffer.

12. The system of claim 10, wherein a message with the lowest priority is deleted within the sender buffer in response to an empty cell being unavailable in the sender buffer.

13. The method of claim 10, wherein a next message transferred from the sender buffer to the bus controller is an oldest stored message in the receiver buffer.

14. The method of claim 10, wherein a next message transferred from the sender buffer to the bus controller is message having a highest priority in the receiver buffer.

15. A method for communicating messages between nodes within a distributed embedded real-time controller area network system of a vehicle, the controller area network system including a communication bus, a bus controller for controlling a transmission of messages on the communication bus where the transfer of messages onto the communication bus is executed by the bus controller on an interrupt basis, the controller area network system further including a plurality of nodes forming a plurality of communication endpoints that are communicably coupled by the communication bus, each node includes at least one application component, an electronic control unit, a sender buffer, a receiver buffer, and at least one bus controller, the method comprising the steps of:

the electronic control unit receiving vehicle operation data from the at least one application component and generating a message that includes the vehicle operation data for transmission on the communication bus, the electronic control unit functioning in an event-triggered mode for initiating the transmission of the message on the communication bus to a next respective node;

storing the message in the sender buffer in response to the bus controller being unavailable, the bus controller being unavailable to receive the next message from the electronic control unit when a previous message stored within a memory of the bus controller is awaiting transmission on the communication bus, and wherein the bus controller is available to receive a message from the electronic control unit when the memory is empty;

determining when the previous message stored in the bus controller is successfully transmitted on the communication bus;

unsetting a traffic shaping flag in response to the previous message stored in the bus controller being successfully transmitted on the communication bus, wherein unsetting the traffic shaping flag indicates that messages cannot be transferred to the bus controller;

determining when the predetermined period of time elapses;

in response to the predetermined period of time elapsing, setting the traffic shaping flag for indicating that a message can be transferred to the bus controller;

transferring the message from the sender buffer to the bus controller in response to setting the traffic shaping flag;

wherein an enqueuing task module manages a transfer of messages from the electronic control unit to the sender buffer, wherein the enqueuing task module determines whether an empty cell is available within the sender buffer, and wherein the message is stored in the empty cell in response to the empty cell being available in the sender buffer; and wherein the sender buffer includes a sender message link list for maintaining a priority ordering of the stored messages, wherein the enqueuing task module adds the message to the sender message link list.

\* \* \* \* \*